United States Patent
Hundemer

(10) Patent No.: US 10,622,018 B2
(45) Date of Patent: Apr. 14, 2020

(54) VIDEO-PRODUCTION SYSTEM WITH METADATA-BASED DVE FEATURE

(71) Applicant: Tribune Broadcasting Company, LLC, Chicago, IL (US)

(72) Inventor: Hank J. Hundemer, Bellevue, KY (US)

(73) Assignee: TRIBUNE BROADCASTING COMPANY, LLC, Chicago, IL (US)

( * ) Notice: Subject to any disclaimer, the term of this patent is extended or adjusted under 35 U.S.C. 154(b) by 0 days.

(21) Appl. No.: 15/295,161

(22) Filed: Oct. 17, 2016

(65) Prior Publication Data

US 2017/0110152 A1     Apr. 20, 2017

Related U.S. Application Data

(60) Provisional application No. 62/242,593, filed on Oct. 16, 2015.

(51) Int. Cl.
*G11B 27/031* (2006.01)
*H04L 29/06* (2006.01)
(Continued)

(52) U.S. Cl.
CPC ............ *G11B 27/031* (2013.01); *G08B 3/10* (2013.01); *G08B 5/36* (2013.01); *G11B 27/11* (2013.01);
(Continued)

(58) Field of Classification Search
CPC .. G11B 27/031; H04N 21/4316; H04N 21/84; H04N 5/262; H04N 5/268; H04N 5/445; H04N 5/45
See application file for complete search history.

(56) References Cited

U.S. PATENT DOCUMENTS 3,627,914 A * 12/1971 Davies ................. H04N 5/262
                                                   348/722
4,163,992 A *  8/1979 Inaba .................... H04N 9/75
                                                   348/169
(Continued)

FOREIGN PATENT DOCUMENTS

EP     2665290 A1    11/2013
GB     1370535 A  * 10/1974   ............. G09G 5/222
(Continued)

OTHER PUBLICATIONS

International Search Report dated Jan. 18, 2017 issued in connection with International Application No. PCT/US2016/057281, filed on Oct. 17, 2016, 3 pages.
(Continued)

*Primary Examiner* — David E Harvey
(74) *Attorney, Agent, or Firm* — McDonnell Boehnen Hulbert & Berghoff LLP

(57) ABSTRACT

In one aspect, an example method includes (i) receiving, by a first computing system, content captured by a second computing system via a camera of the second computing system; (ii) receiving, by the first computing system, metadata of the received content, wherein the metadata was generated by the second computing system proximate a time when the second computing system captured the content; (iii) executing, by the first computing system, a digital-video effect (DVE), wherein executing the DVE causes the first computing system to generate video content that includes the received content and content derived from the received metadata; and (iv) transmitting, by the first computing system, to a third computing system, the generated video content for presentation of the generated video content on the third computing system.

20 Claims, 7 Drawing Sheets

(51) Int. Cl.

| | | |
|---|---|---|
| G11B 27/11 | (2006.01) | |
| H04N 21/234 | (2011.01) | |
| H04N 21/24 | (2011.01) | |
| H04N 5/232 | (2006.01) | |
| G11B 27/19 | (2006.01) | |
| H04N 21/84 | (2011.01) | |
| H04N 21/845 | (2011.01) | |
| H04N 21/854 | (2011.01) | |
| H04N 21/262 | (2011.01) | |
| H04N 21/81 | (2011.01) | |
| H04N 21/44 | (2011.01) | |
| H04N 21/4627 | (2011.01) | |
| H04N 21/472 | (2011.01) | |
| H04N 21/6587 | (2011.01) | |
| H04N 21/439 | (2011.01) | |
| H04N 21/442 | (2011.01) | |
| H04N 21/488 | (2011.01) | |
| H04N 5/77 | (2006.01) | |
| H04R 29/00 | (2006.01) | |
| G08B 3/10 | (2006.01) | |
| G08B 5/36 | (2006.01) | |
| H04N 5/272 | (2006.01) | |
| H04N 7/01 | (2006.01) | |

(52) U.S. Cl.
CPC .......... *G11B 27/19* (2013.01); *H04L 65/4076* (2013.01); *H04L 65/602* (2013.01); *H04L 65/605* (2013.01); *H04L 65/607* (2013.01); *H04N 5/232* (2013.01); *H04N 5/23251* (2013.01); *H04N 5/23261* (2013.01); *H04N 5/23267* (2013.01); *H04N 5/272* (2013.01); *H04N 5/77* (2013.01); *H04N 7/0127* (2013.01); *H04N 21/234* (2013.01); *H04N 21/23424* (2013.01); *H04N 21/24* (2013.01); *H04N 21/2408* (2013.01); *H04N 21/262* (2013.01); *H04N 21/4394* (2013.01); *H04N 21/44* (2013.01); *H04N 21/44008* (2013.01); *H04N 21/44209* (2013.01); *H04N 21/4627* (2013.01); *H04N 21/472* (2013.01); *H04N 21/4884* (2013.01); *H04N 21/6587* (2013.01); *H04N 21/8126* (2013.01); *H04N 21/84* (2013.01); *H04N 21/8456* (2013.01); *H04N 21/854* (2013.01); *H04R 29/001* (2013.01); *H04N 5/23293* (2013.01); *H04R 2420/05* (2013.01); *H04R 2420/07* (2013.01)

(56) References Cited

U.S. PATENT DOCUMENTS

| | | | | | |
|---|---|---|---|---|---|
| 4,200,890 | A * | 4/1980 | Inaba | ........... | H04N 5/275 348/169 |
| 4,218,709 | A * | 8/1980 | Baxter | ........... | H04N 5/268 348/584 |
| 4,240,104 | A * | 12/1980 | Taylor | ........... | H04N 9/75 348/587 |
| 4,621,280 | A * | 11/1986 | Shinohara | ........... | H04N 9/75 348/587 |
| 4,812,909 | A * | 3/1989 | Yokobayashi | ........... | H04N 5/278 348/584 |
| 4,835,613 | A * | 5/1989 | Johnson | ........... | H04N 5/222 348/569 |
| 4,858,011 | A * | 8/1989 | Jackson | ........... | H04N 5/268 348/705 |
| 5,023,721 | A * | 6/1991 | Moon-Hwan | ........... | H04N 5/44513 348/468 |
| 5,031,043 | A * | 7/1991 | Rocco | ........... | H04N 5/272 348/589 |
| 5,182,640 | A * | 1/1993 | Takano | ........... | G11B 27/028 348/722 |
| 5,282,038 | A * | 1/1994 | Lowe | ........... | H04N 5/268 348/659 |
| 5,329,315 | A * | 7/1994 | Moriwake | ........... | H04H 60/04 348/473 |
| 5,481,318 | A * | 1/1996 | Flowers | ........... | H04N 5/44591 348/589 |
| 5,557,342 | A * | 9/1996 | Eto | ........... | H04N 5/45 348/204 |
| 5,671,019 | A * | 9/1997 | Isoe | ........... | H04N 5/44513 348/468 |
| 5,734,436 | A * | 3/1998 | Abe | ........... | H04N 5/44591 348/564 |
| 5,809,245 | A * | 9/1998 | Zenda | ........... | G06F 17/30017 345/204 |
| 5,822,019 | A * | 10/1998 | Takeuchi | ........... | G11B 27/031 348/722 |
| 5,913,008 | A * | 6/1999 | Itou | ........... | G11B 27/028 348/552 |
| 5,978,046 | A * | 11/1999 | Shintani | ........... | H04N 5/45 348/589 |
| 6,008,860 | A * | 12/1999 | Patton | ........... | H04N 5/45 348/564 |
| 6,011,594 | A * | 1/2000 | Takashima | ........... | H04N 5/45 348/565 |
| 6,020,931 | A * | 2/2000 | Bilbrey | ........... | H04N 5/222 348/584 |
| 6,097,442 | A * | 8/2000 | Rumreich | ........... | H04N 5/44513 348/563 |
| 6,124,896 | A * | 9/2000 | Kurashige | ........... | H04N 5/272 348/584 |
| 6,441,864 | B1 * | 8/2002 | Minami | ........... | H04N 5/272 348/584 |
| 6,538,676 | B1 * | 3/2003 | Peters | ........... | G06F 3/017 382/103 |
| 6,833,865 | B1 * | 12/2004 | Fuller | ........... | G06F 17/30247 348/231.2 |
| 7,123,816 | B2 * | 10/2006 | McGrath | ........... | G11B 27/028 386/331 |
| 7,173,667 | B2 * | 2/2007 | Oh | ........... | H04N 5/44513 348/461 |
| 7,525,601 | B2 * | 4/2009 | Sugimoto | ........... | H04N 5/262 348/578 |
| 7,623,176 | B2 * | 11/2009 | Hoshino | ........... | G11B 27/11 348/231.3 |
| 7,631,330 | B1 * | 12/2009 | Des Jardins | ........... | H04N 7/17336 715/205 |
| 7,817,778 | B2 * | 10/2010 | Nord | ........... | A61N 5/1047 378/65 |
| 7,903,903 | B1 * | 3/2011 | Acker | ........... | H04N 5/222 348/578 |
| 8,208,796 | B2 * | 6/2012 | Prus | ........... | G11B 15/689 386/291 |
| 8,385,726 | B2 * | 2/2013 | Kuno | ........... | G06F 3/14 345/589 |
| 8,395,651 | B2 * | 3/2013 | DeGrazia | ........... | G01S 5/0268 348/14.01 |
| 8,456,571 | B1 * | 6/2013 | Taylor | ........... | H04N 7/0122 348/445 |
| 8,560,951 | B1 * | 10/2013 | Snyder | ........... | G11B 27/034 715/720 |
| 8,572,086 | B2 * | 10/2013 | Soderberg | ........... | G06F 17/3028 382/180 |
| 9,185,321 | B1 * | 11/2015 | Laframboise | ........... | H04N 5/272 |
| 9,721,011 | B1 * | 8/2017 | Abeloe | ........... | G06F 17/3082 |
| 2001/0018693 | A1 * | 8/2001 | Jain | ........... | G06F 17/30265 715/201 |
| 2001/0019657 | A1 * | 9/2001 | McGrath | ........... | G11B 27/028 386/331 |
| 2002/0059625 | A1 * | 5/2002 | Kurauchi | ........... | G11B 27/034 725/91 |
| 2002/0136531 | A1 * | 9/2002 | Harradine | ........... | G06Q 30/02 386/239 |
| 2002/0152462 | A1 * | 10/2002 | Hoch | ........... | H04N 5/222 725/37 |

(56) References Cited

U.S. PATENT DOCUMENTS

| | | | | |
|---|---|---|---|---|
| 2002/0194620 | A1* | 12/2002 | Zdepski | H04N 7/165 |
| | | | | 725/138 |
| 2003/0088997 | A1* | 5/2003 | Mihailovich | A43B 3/16 |
| | | | | 36/7.1 R |
| 2003/0093790 | A1* | 5/2003 | Logan | G06F 17/30265 |
| | | | | 725/38 |
| 2003/0093810 | A1* | 5/2003 | Taniguchi | G08B 13/19656 |
| | | | | 725/112 |
| 2003/0214605 | A1* | 11/2003 | Snyder | G06F 3/0481 |
| | | | | 348/578 |
| 2004/0249861 | A1* | 12/2004 | Hoshino | G11B 27/11 |
| 2005/0031296 | A1* | 2/2005 | Grosvenor | G06F 17/30793 |
| | | | | 386/282 |
| 2005/0104976 | A1* | 5/2005 | Currans | G06F 17/30265 |
| | | | | 348/231.5 |
| 2006/0017850 | A1* | 1/2006 | Hsieh | H04N 5/44513 |
| | | | | 348/564 |
| 2008/0075431 | A1* | 3/2008 | Moriya | G06F 17/30802 |
| | | | | 386/278 |
| 2008/0106645 | A1* | 5/2008 | Lee | H04N 5/44504 |
| | | | | 348/565 |
| 2009/0115895 | A1* | 5/2009 | Wang | H04N 5/23293 |
| | | | | 348/468 |
| 2009/0187826 | A1* | 7/2009 | Heimbold | H04N 5/262 |
| | | | | 715/719 |
| 2010/0103324 | A1* | 4/2010 | Maegawa | H04H 20/103 |
| | | | | 348/705 |
| 2010/0182508 | A1* | 7/2010 | Casper | H04N 5/265 |
| | | | | 348/578 |
| 2011/0096135 | A1* | 4/2011 | Hegde | H04N 5/23219 |
| | | | | 348/14.07 |
| 2012/0249831 | A1* | 10/2012 | Porter | H04N 5/23206 |
| | | | | 348/231.3 |
| 2014/0095504 | A1 | 4/2014 | Kourosh | |
| 2015/0135212 | A1* | 5/2015 | Smolic | H04N 21/4122 |
| | | | | 725/32 |
| 2016/0248989 | A1* | 8/2016 | Cross | H04N 5/265 |

FOREIGN PATENT DOCUMENTS

| | | | | |
|---|---|---|---|---|
| GB | 2547750 A | * | 8/2017 | H04N 21/4312 |
| KR | 1020120072013 A | | 7/2012 | |
| KR | 101447784 B1 | | 10/2014 | |
| WO | WO-9827725 A1 | * | 6/1998 | H04N 5/45 |
| WO | 2013155455 A2 | | 10/2013 | |

OTHER PUBLICATIONS

Written Opinion of the International Searching Authority dated Jan. 18, 2017 issued in connection with International Application No. PCT/US2016/057281 filed on Oct. 17, 2016, 6 pages.

* cited by examiner

VIDEO-PRODUCTION SYSTEM WITH METADATA-BASED DVE FEATURE

RELATED DISCLOSURES

This disclosure claims priority to U.S. Provisional Patent Application No. 62/242,593, titled "Video Production System with Content-Related Features," filed on Oct. 16, 2015, which is hereby incorporated by reference in its entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method includes (i) receiving, by a first computing system, content captured by a second computing system via a camera of the second computing system; (ii) receiving, by the first computing system, metadata of the received content, wherein the metadata was generated by the second computing system proximate a time when the second computing system captured the content; (iii) executing, by the first computing system, a digital-video effect (DVE), wherein executing the DVE causes the first computing system to generate video content that includes the received content and content derived from the received metadata; and (iv) transmitting, by the first computing system, to a third computing system, the generated video content for presentation of the generated video content on the third computing system.

In another aspect, an example non-transitory computer-readable medium is disclosed. The computer-readable medium has stored thereon program instructions that upon execution by a processor, cause performance of a set of acts including (i) receiving, by a first computing system, content captured by a second computing system via a camera of the second computing system; (ii) receiving, by the first computing system, metadata of the received content, wherein the metadata was generated by the second computing system proximate a time when the second computing system captured the content; (iii) executing, by the first computing system, a DVE, wherein executing the DVE causes the first computing system to generate video content that includes the received content and content derived from the received metadata; and (iv) transmitting, by the first computing system, to a third computing system, the generated video content for presentation of the generated video content on the third computing system.

In another aspect, an example first computing system is disclosed. The first computing system is configured for performing a set of acts including (i) receiving, by the first computing system, content captured by a second computing system via a camera of the second computing system; (ii) receiving, by the first computing system, metadata of the received content, wherein the metadata was generated by the second computing system proximate a time when the second computing system captured the content; (iii) executing, by the first computing system, a DVE, wherein executing the DVE causes the first computing system to generate video content that includes the received content and content derived from the received metadata; and (iv) transmitting, by the first computing system, to a third computing system, the generated video content for presentation of the generated video content on the third computing system.

In another aspect, an example method is disclosed. The method includes (i) receiving, by a first computing system, content captured by a second computing system via a camera of the second computing system; (ii) receiving, by the first computing system, metadata of the received content, wherein the metadata was generated by the second computing system proximate a time when the second computing system captured the content; (iii) using, by the first computing system, the received metadata and predetermined data accessed by the first computing system, to determine data related to the received content; (iv) executing, by the first computing system, a DVE, wherein executing the DVE causes the first computing system to generate video content that includes the received content and the determined data; and (v) transmitting, by the first computing system, to a third computing system, the generated video content for presentation of the generated video content on the third computing system.

In another aspect, an example non-transitory computer-readable medium is disclosed. The computer-readable medium has stored thereon program instructions that upon execution by a processor, cause performance of a set of acts including (i) receiving, by a first computing system, content captured by a second computing system via a camera of the second computing system; (ii) receiving, by the first computing system, metadata of the received content, wherein the metadata was generated by the second computing system proximate a time when the second computing system captured the content; (iii) using, by the first computing system, the received metadata and predetermined data accessed by the first computing system, to determine data related to the received content; (iv) executing, by the first computing system, a DVE, wherein executing the DVE causes the first computing system to generate video content that includes the received content and the determined data; and (v) transmitting, by the first computing system, to a third computing system, the generated video content for presentation of the generated video content on the third computing system.

In another aspect, an example first computing system is disclosed. The first computing system is configured for performing a set of acts including (i) receiving, by the first computing system, content captured by a second computing system via a camera of the second computing system; (ii) receiving, by the first computing system, metadata of the received content, wherein the metadata was generated by the second computing system proximate a time when the second computing system captured the content; (iii) using, by the first computing system, the received metadata and predetermined data accessed by the first computing system, to determine data related to the received content; (iv) executing, by the first computing system, a DVE, wherein executing the DVE causes the first computing system to generate video content that includes the received content and the determined data; and (v) transmitting, by the first computing system, to a third computing system, the generated video content for presentation of the generated video content on the third computing system.

DETAILED DESCRIPTION

I. Overview

Figure 1:
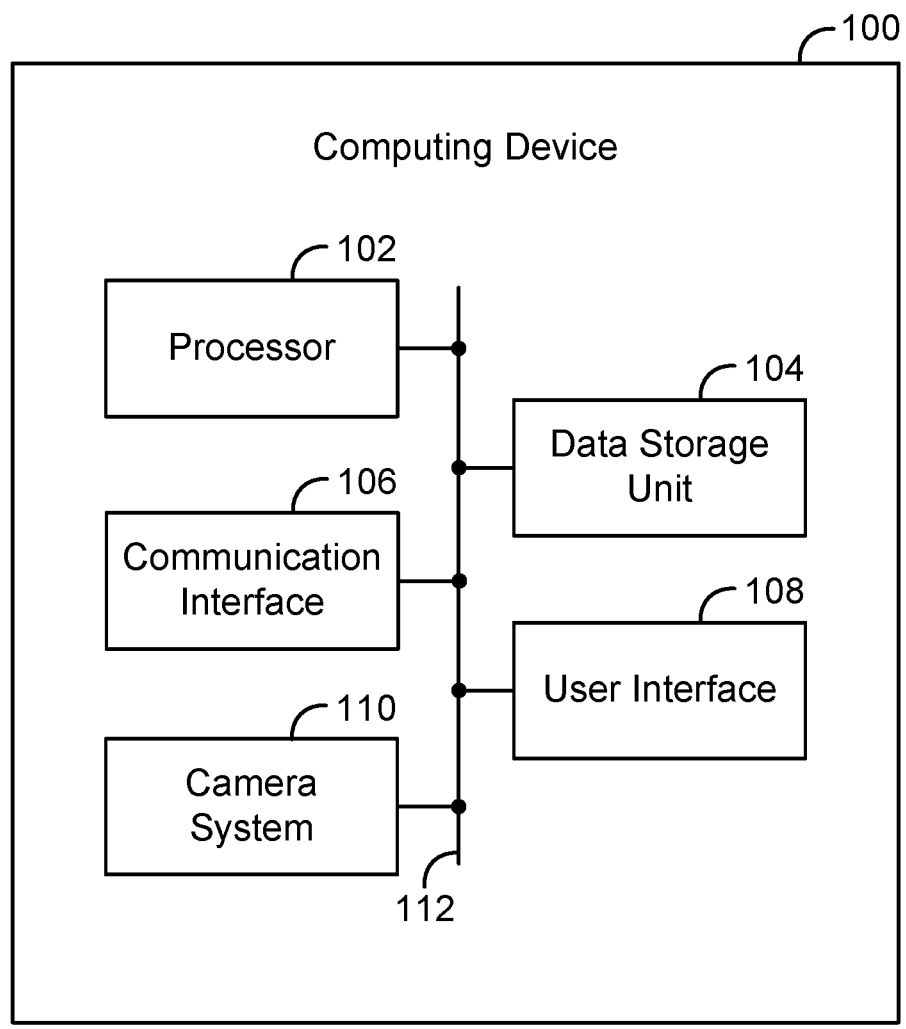
FIG. 1 is a simplified block diagram of an example computing device.

A VPS can generate video content that can serve as or be part of a video program (e.g., a news program). The VPS can then transmit the video content to a video-broadcast system (VBS), which in turn can transmit the video content to an end-user device for presentation of the video content to an end-user.

The VPS can include various components to facilitate generating video content. For example, the VPS can include a video source, a content system, a first DVE system, and a second DVE system.

The video source can generate first video content, and can transmit the first video content to the second DVE system. In one example, the video source can take the form of a video camera directed towards a scene where a news anchor is discussing a news story. Thus, in one example, the process of the video source generating the first video content can involve the video source capturing first video content showing the scene where the news anchor is discussing the news story.

The content system can transmit content, such as a set of images relating to the news story, to the first DVE system. The first DVE system can receive the content, and can execute a DVE, which causes the first DVE system to generate second video content that includes the received content. For example, the generated second video content can show the set of images scrolling from right to left. The first DVE system can then transmit the generated second video content to the second DVE system.

The second DVE system can receive the first video content and the second video content, and can execute a DVE, which causes the DVE system to overlay the second video content on a portion of the first video content, thereby generating third video content. As such, in one example, the third video content can include the scrolling images overlaid on a portion of the scene where the news anchor is discussing the news story. The third video content can serve as or be part of a video program. Thus, in this way, the VPS can integrate content, such as a set of images, into a video program.

The VPS can also include a scheduling system and a sequencing system. The scheduling system can create a program schedule, perhaps based on input received from a user (e.g., a producer or technical director) via a user interface. The sequencing system can process records in the program schedule, and based on the processed records, can control one or more components of the VPS, such as the video source, the content system, the first DVE system, and the second DVE system, to facilitate generating video content, such as in the manner described above.

As noted above, the first DVE system can receive content and can execute a DVE that causes the first DVE system to generate video content that includes the received content. In another example, the first DVE system can receive content and can also receive metadata of that content. The first DVE system can then execute a DVE that causes the first DVE system to generate video content that includes the received content and content derived from the received metadata. This can improve the end-user's viewing experience by providing the end-user with data that is relevant to the content that the user is viewing.

In one example, in the case where the content is an image and the metadata represents a time at which a device captured the image with a camera, the first DVE system can execute a DVE that causes the first DVE system to generate video content that includes the image and the content derived from the metadata (e.g., text or graphics) overlaid on at least a portion of the image. For example, where the metadata specifies "7:44 pm ET on Sep. 9, 2016," the generated video content can include the following text overlaid on at least a portion of the image: "Photo taken at 7:44 pm ET on Sep. 9, 2016."

In some examples, the first DVE system can use the received metadata and predetermined data, to determine other data related to the received content. Then, the first DVE system can execute a DVE that causes the first DVE system to generate video content that includes the received content and the determined data.

For example, in the case where the content is an image and the metadata represents a time at which a device captured the image with a camera, the first DVE system can use the metadata to determine a time period that has elapsed since the time at which the end-user device 304 captured the image. Then, the first DVE system can execute a DVE that causes the first DVE system to generate video content that includes the image and the determined data overlaid on at least a portion of the image. For example, where the metadata specifies "7:44 pm ET on Sep. 9, 2016," and the time at which the first DVE system executes the corresponding DVE is "8:54 pm ET on Sep. 9, 2016," the generated video content can include the following text overlaid on at least a portion of the image: "Photo taken 1 hour and 10 minutes ago."

Although examples have been provided above in connection with image content, the examples can be varied as appropriate to apply to other types of content. For instance, in some examples, the first DVE system can receive video content and metadata, and can generate a DVE that causes the first DVE system to generate video content that includes the received video content and content derived from the metadata (e.g., with the derived content being overlaid on a portion of the received video content).

Alternatively, the first DVE system can use the received metadata and predetermined data, to determine data related to the received video content, and can generate a DVE that causes the first DVE system to generate video content that includes the received video content and the determined data (e.g., with the determined data being overlaid on a portion of the received video content).

II. Example Architecture

A. Computing Device

FIG. 1 is a simplified block diagram of an example computing device 100. The computing device can be configured to perform and/or can perform one or more acts and/or functions, such as those described in this disclosure. The computing device 100 can include various components, such as a processor 102, a data storage unit 104, a communication interface 106, a user interface 108, and/or a camera system 110. Each of these components can be connected to each other via a connection mechanism 112.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

The processor 102 can include a general-purpose processor (e.g., a microprocessor) and/or a special-purpose processor (e.g., a digital signal processor (DSP)). The processor 102 can execute program instructions included in the data storage unit 104 as discussed below.

The data storage unit 104 can include one or more volatile, non-volatile, removable, and/or non-removable storage components, such as magnetic, optical, and/or flash storage, and/or can be integrated in whole or in part with the processor 102. Further, the data storage unit 104 can take the form of a non-transitory computer-readable storage medium, having stored thereon program instructions (e.g., compiled or non-compiled program logic and/or machine code) that, upon execution by the processor 102, cause the computing device 100 to perform one or more acts and/or functions, such as those described in this disclosure. These program instructions can define and/or be part of a discrete software application. In some instances, the computing device 100 can execute program instructions in response to receiving an input, such as an input received via the communication interface 106 and/or the user interface 108. The data storage unit 104 can also store other types of data, such as those types described in this disclosure.

The communication interface 106 can allow the computing device 100 to connect with and/or communicate with another entity according to one or more protocols. In one example, the communication interface 106 can be a wired interface, such as an Ethernet interface or a high-definition serial-digital-interface (HD-SDI). In another example, the communication interface 106 can be a wireless interface, such as a cellular or WI-FI interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

The user interface 108 can include hardware and/or software components that facilitate interaction between the computing device 100 and a user of the computing device 100, if applicable. As such, the user interface 108 can include input components such as a keyboard, a keypad, a mouse, a touch-sensitive panel, and/or a microphone, and/or output components such as a display device (which, for example, can be combined with a touch-sensitive panel), a sound speaker, and/or a haptic feedback system.

The camera system 110 can include hardware and/or software components that facilitate capturing and processing content (e.g., individual images and/or video content). For example, the camera system 110 can include a camera, a frame grabber, and an encoder. The camera can capture video content in the form of a series of images or "frames," and can then transmit the video content to the encoder. The frame grabber can interface with the camera to assist in capturing the video content, such as by receiving the video content from the camera and then storing the video content and/or transmitting the video content to the encoder. The encoder can receive the video content from the frame grabber (or, in some instances, directly from the camera), encode the video content to generate a video stream, format the video stream into data packets, and transmit the packets of the video stream to a memory buffer (e.g., in the data storage unit 104), which can receive and store the packets. The encoder can encode video content according to various standards. For example, the encoder can encode video content in accordance with the H.264 (MPEG-4 AVC) standard, the MPEG-2 Part 2 standard, or the VP8 standard.

The computing device 100 can take various forms, such as a workstation terminal, a desktop computer, a laptop, a tablet, a mobile phone, a set-top box, and/or a television.

B. Video System

Figure 2:
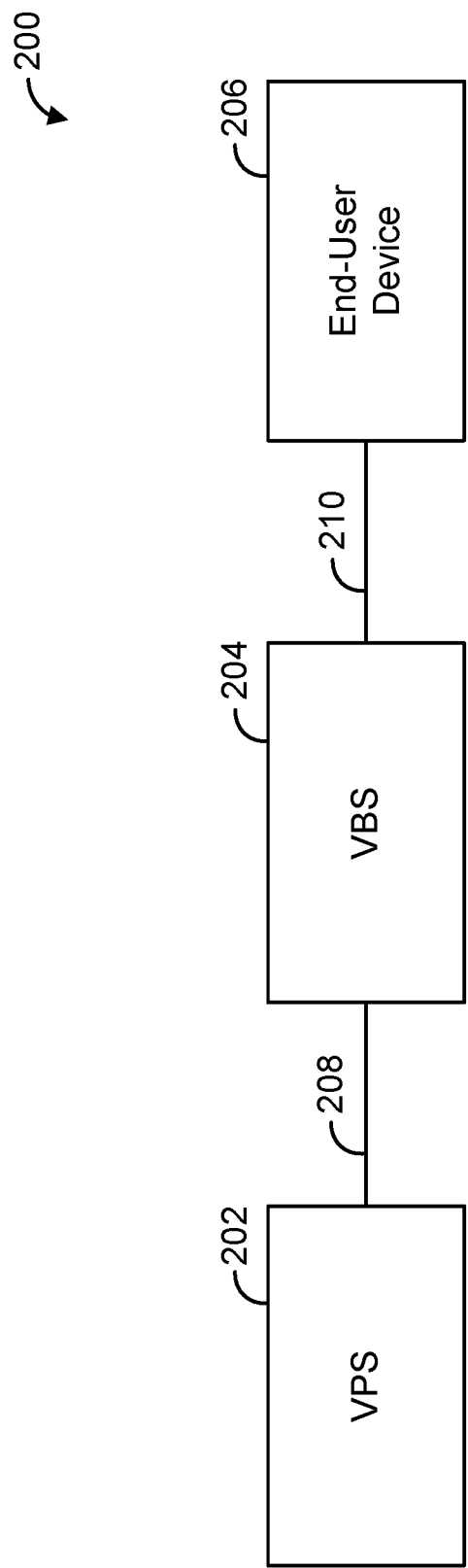
FIG. 2 is a simplified block diagram of an example video system.

FIG. 2 is a simplified block diagram of an example video system 200. The video system 200 can perform various acts and/or functions, and can be implemented as a computing system. In this disclosure, the term "computing system" means a system that includes at least one computing device. In some instances, a computing system can include one or more other computing systems.

The video system 200 can include various components, such as a VPS 202, a VBS 204, and an end-user device 206, each of which can be implemented as a computing system. The video system 200 can also include a connection mechanism 208, which connects the VPS 202 with the VBS 204; and a connection mechanism 210, which connects the VBS 204 with the end-user device 206.

Figure 3:
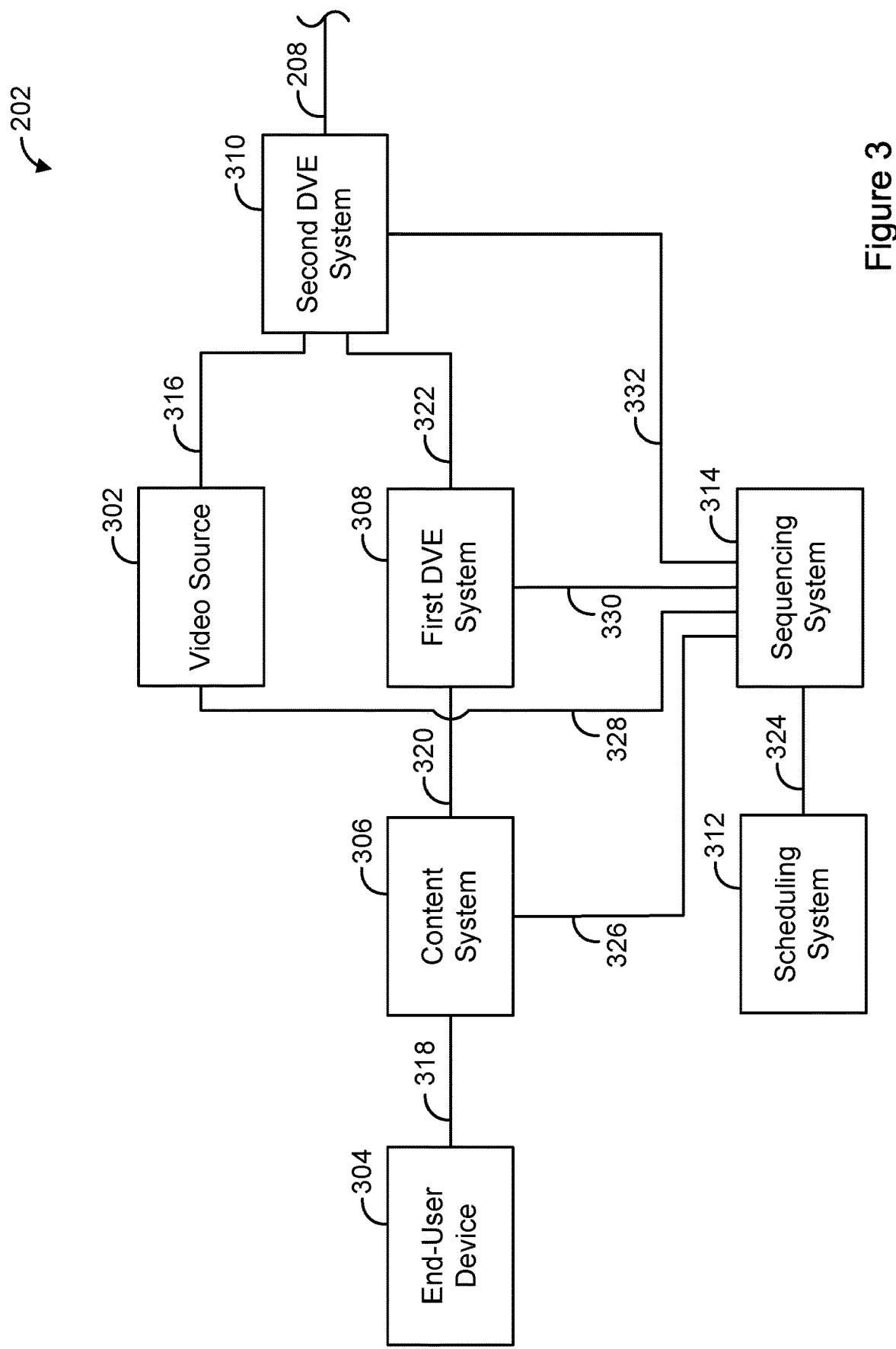
FIG. 3 is a simplified block diagram of an example video-production system (VPS).

FIG. 3 is a simplified block diagram of an example VPS 202. The VPS 202 can include various components, such as a video source 302, an end-user device 304, a content system 306, a first DVE system 308, a second DVE system 310, a scheduling system 312, and a sequencing system 314, each of which can be implemented as a computing system.

The VPS 202 can also include a connection mechanism 316, which connects the video source 302 with the second DVE system 310; a connection mechanism 318, which connects the end-user device 304 with the content system 306; a connection mechanism 320, which connects the content system 306 with the first DVE system 308; a connection mechanism 322, which connects the first DVE system 308 with the second DVE system 310; a connection mechanism 324, which connects the scheduling system 312 with the sequencing system 314; a connection mechanism 326, which connects the sequencing system 314 with the content system 306; a connection mechanism 328, which connects the sequencing system 314 with the video source 302; a connection mechanism 330, which connects the sequencing system 314 with the first DVE system 308; and a connection mechanism 332, which connects the sequencing system 314 with the second DVE system 310.

The video source 302 can take various forms, such as a video camera, a video server, a satellite receiver, or a DVE system. An example video server is the K2 server provided by Grass Valley of San Francisco, Calif.

The end-user device 304 can take various forms. In practice, the VPS 202 is likely to include a large number of end-user devices 304 and corresponding connection mechanisms, each connecting a respective one of the end-user devices 304 with the content system 306. The content system 306 can also take various forms.

The first DVE system 308 can take various forms. An example first DVE system is VIZ TRIO provided by Viz Rt of Bergen, Norway. Another example first DVE system is CASPAR CG provided by the Swedish Broadcasting Corporation.

The second DVE system 310 can take various forms, such as a production switcher. An example production switcher is VISION OCTANE provided by Ross Video Ltd. of Iroquois, Ontario in Canada.

The scheduling system 312 can take various forms. An example scheduling system is WO TRAFFIC provided by WideOrbit, Inc. of San Francisco, Calif. Another example scheduling system is OSI-TRAFFIC provided by Harris Corporation of Melbourne, Fla. A scheduling system is sometimes referred to in the industry as a "traffic system."

The sequencing system 314 can take various forms. A sequencing system is sometimes referred to in the industry as a "production automation system."

Referring back to FIG. 2, the VBS 204 can include various components, such as a terrestrial antenna and/or a satellite transmitter, each of which can be implemented as a computing system.

Each of the video-based entities described in this disclosure can include or be integrated with a corresponding audio-based entity. Also, the video content described in this disclosure can include or be integrated with corresponding audio content.

III. Example Operations

The video system 200 and/or components thereof can perform various acts and/or functions. Examples of these and related features will now be described.

The video system 200 can perform various acts and/or functions related to video content. For example, the video system 200 can receive, generate, output, and/or transmit video content that can serve as or be part of a video program (e.g., a news program). In this disclosure, the act of receiving, generating, outputting, and/or transmitting video content can occur in various ways and/or according to various standards. For example, the act of receiving, outputting, and/or transmitting video content can include receiving, outputting, and/or transmitting a video stream representing the video content, such as over Internet Protocol (IP) or in accordance with the high-definition serial digital interface (HD-SDI) standard. Likewise, the act of generating video content can include generating a video stream representing the video content. Also, the act of receiving, generating, outputting, and/or transmitting video content can include receiving, generating, outputting, and/or transmitting an encoded or decoded version of the video content.

The VPS 202 can perform various acts and/or functions related to video content production. For example, the VPS 202 can generate and/or output video content, and can transmit the video content to another entity, such as the VBS 204.

Referring again to FIG. 3, the video source 302 can generate and/or output video content, and can transmit the video content to another entity, such as the second DVE system 310. In practice, the VPS 202 is likely to include multiple video sources 302 and corresponding connection mechanisms, each connecting a respective one of the video sources 302 with the second DVE system 310.

As noted above, in one example, the video source 302 can take the form of a video camera. In one example, the video camera can be directed towards a scene where a news anchor is discussing a news story. Thus, in one example, the process of the video source 302 generating video content can involve the video source 302 capturing video content showing the scene where the news anchor is discussing the news story.

As noted above, in another example, the video source 302 can take the form of a video server. A video server can record and/or store video content (e.g., in the form of a file). Further, the video server can retrieve stored video content and can use the retrieved video content to generate and/or output a video stream representing the video content. This is sometimes referred to in the industry as the video server "playing out" the video content. The video server can then transmit the video stream, thereby transmitting the video content, to another entity, such as the second DVE system 310.

The end-user device 304 can perform various acts and/or functions related to various types of content, perhaps based on input received from a user (e.g., a field reporter) via a user interface. For example, the end-user device 304 can capture content (e.g., an image and/or video content) via a camera of the end-user device 304. This can allow the end-user device 304 to capture content of a newsworthy event so that the VPS 202 can integrate the content into a video program.

The end-user device 304 can also store content in a data storage unit (e.g., a data storage unit of the end-user device 304). At a later time, the end-user device 304 can select and/or retrieve the stored content, and can transmit it to another entity, such as the content system 306.

In the case where the end-user device 304 is using a camera to capture video content, in one example, proximate the time that the end-user device 304 is capturing the content (i.e., without significant delay), the end-user device 304 can transmit the captured video content to the content system 306. This is sometimes referred to in the industry as a "live video transmission" or a "live video stream." Similarly, each of the other entities within the VPS 202 and the VBS 204 can receive content and, proximate the time that the content is being received, generate, output, and/or transmit content to the next entity in the video production path. This can allow for live video transmission through all or part of the video system 200, as desired.

In the case where the end-user device 304 uses a camera to capture content, the end-user device 304 can also generate metadata of the captured content. In one example, the end-user device 304 can generate this metadata proximate a time that the end-user device 304 captures the content.

In one example, the metadata can represent a time at which the end-user device 304 captured at least a portion of the content (in this context, the term "time" means a time and/or a date). For instance, in the case where the content is an image, the metadata can represent a time at which the end-user device 304 captured the image. Alternatively, in the case where the content is video content, the metadata can represent a time at which the end-user device 304 started capturing the video content.

In another example, the metadata can represent a location of the end-user device 304 proximate a time when the end-user device 304 captured at least a portion of the content. For instance, in the case where the content is an image, the metadata can represent a location at which the end-user device 304 captured the image. Alternatively, in the case where the content is video content, the metadata can represent a location at which the end-user device 304 started capturing the video content, or a location at which the end-user device 304 captured a given portion of the video content. In some cases, the metadata can represent multiple locations, with each location representing a location of the end-user device 304 proximate a time when the end-user device 304 captured a respective portion of the video content. Metadata representing a location of the end-user device 304 can take various forms. For example, the metadata can take the form of global positioning system (GPS) coordinates.

In some examples, the metadata can represent information associated with the user of the end-user device 304, such as a name, a screenname, a social media account identifier, an organization with which the user is associated, etc. In some cases, such user-associated metadata information can be used to provide attribution of the content that is provided from the end-user device 304.

The end-user device 304 can store metadata in a data storage unit (e.g., a data storage unit of the end-user device 304), perhaps in a manner that associates the metadata with its corresponding content. At a later time, the end-user device 304 can select and/or retrieve the stored content, and can transmit it to another entity, such as the content system 306. In some examples, in the case where the end-user device 304 performs an operation in connection with content, the end-user device 304 can perform a parallel operation in connection with the metadata of that content. For example, if the end-user device 304 selects, retrieves, and transmits content to the content system 306, the end-user device 304 can also select, retrieve, and transmit the metadata of the content to the content system 306.

Like the end-user device 304, the content system 306 can perform various acts and/or functions related to content, perhaps based on input received from a user (e.g., a producer or technical director) via a user interface. For example, the content system 306 can receive content and can do so in various ways. In one example, the content system 306 can receive content from another entity, such as the end-user device 304.

The content system 306 can also store, select, and/or retrieve content. As such, the content system 306 can store received content in a data storage unit (e.g., a data storage unit of the content system 306), and can then receive the content by selecting and retrieving it from the data storage unit.

The content system 306 can also modify content, and can do so in various ways. Among other things, this can allow the content system 306 to remove vulgarities, personal information, and/or extraneous information that is not suitable or desirable for integration into a video program.

The content system 306 can also transmit content to another entity, such as the first DVE system 308. In this disclosure, receiving and transmitting content can include forwarding the content. Alternatively, receiving and transmitting content can include receiving the content and transmitting a copy of the content. As such, in one example, the content system 306 can receive content from the end-user device 304, and can transmit a copy of the content to the first DVE system 308.

As with the end-user device 304, in the case where the content system 306 performs an operation in connection with content, the content system 306 can perform a parallel operation in connection with the metadata of that content. For example, the content system 306 can modify metadata by adding a unique identification number to the metadata to facilitate managing the corresponding content. The content system 306 can use metadata for various reasons. For example, the content system 306 can receive search terms and can match the search terms to metadata for the purposes of searching for and/or selecting relevant content.

The first DVE system 308 can perform various acts and/or functions related to a DVE, perhaps based on input received from a user (e.g., a producer or technical director) via a user interface. For example, the first DVE system 308 can perform a set of steps based on a DVE template to generate and/or output video content. This is sometimes referred to in the industry as "executing a DVE."

The first DVE system 308 can create and/or modify a DVE template. Further, the first DVE system 308 can store and/or retrieve a DVE template. As such, the first DVE system 308 can store a DVE template in a data storage unit (e.g., a data storage unit of the first DVE system 308), and can then receive the DVE template by selecting and retrieving it from the data storage unit.

In some instances, the first DVE system 308 can use the DVE template and content to generate and/or output video content that includes the content. The first DVE system 308 can receive content to use for this purpose in various ways. For example, the first DVE system 308 can receive content from another entity, such as the content system 306. In another example, the first DVE system 308 can receive content by selecting and retrieving it from a data storage unit (e.g., a data storage unit of the content system 306).

A DVE template can specify how the first DVE system 308 is to receive content. In one example, a DVE template can do so by specifying that the first DVE system 308 is to receive content on a particular input of the first DVE system 308 (e.g., an input that maps to a particular entity, such as the content system 306). In another example, a DVE template can do so by specifying that the first DVE system 308 is to receive content by retrieving it from a particular location of a particular data storage unit (e.g., a data storage unit of the first DVE system 308).

After the first DVE system 308 generates and/or outputs video content, the first DVE system 308 can transmit the video content to another entity, such as the second DVE system 310, and/or can store the video content in a data storage unit (e.g., a data storage unit of the first DVE system 308). As such, in one example, the first DVE system 308 can receive content, can use the content to generate and/or output video content that includes the content, and can transmit the video content to the second DVE system 310.

A DVE template can be configured in various ways and can specify various aspects of a DVE. For example, the DVE template can specify a set of ordered steps and various timing aspects, such as when each step is to start being performed and for how long each step is to be performed. The steps can relate to retrieving and/or arranging content within a specified frame or specified frames of video content. The DVE template can specify that a given step is to start being performed at a predefined time, or that a given step is to start being performed at the occurrence of, or after a time offset from the occurrence of, a particular event, such as the conclusion of the performance of a previous step. In another example, the occurrence of the particular event can be the receipt of input from a user via a user interface. In another example, the occurrence of the particular event can be the receipt of an instruction from the sequencing system 314.

To illustrate various aspects of a DVE, an example DVE will now be discussed. In connection with this example, the first DVE system 308 can execute a DVE that causes the first DVE system 308 to generate video content showing overlay images A, B, C, and D scrolling from right to left over a background image. FIGS. 4A-4D are simplified depictions of example frames of the generated video content at various states of the DVE execution process.

Figure 4A:
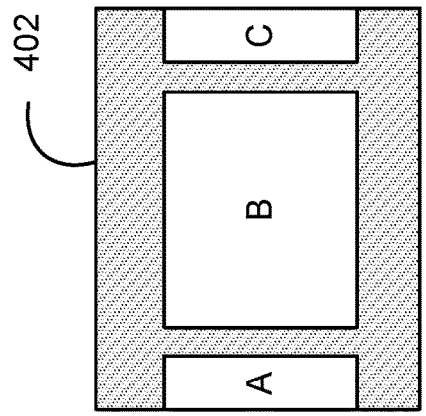
FIG. 4A is a simplified diagram of an example frame of video content, resulting from the performance of a first step in connection with a DVE.

During a first time period, the first DVE system 308 can perform a first step that involves "moving" from right to left, images A and B until image A is positioned over a center region of the background image. FIG. 4A is a simplified depiction of an example frame 400 at the end of the first time period.

Figure 4B:
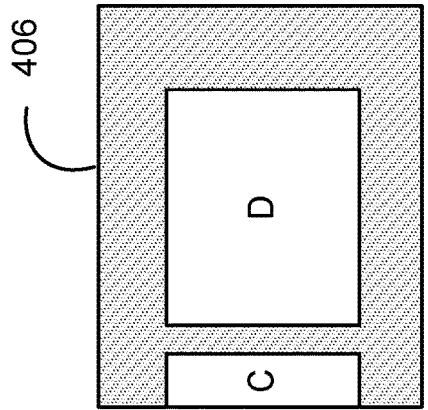
FIG. 4B is a simplified diagram of an example frame of video content, resulting from the performance of a second step in connection with the DVE.

During a next, second time period, the first DVE system 308 can perform a second step that involves "moving" from right to left, images A, B, and C until image B is positioned over the center region of the background image. FIG. 4B is a simplified depiction of an example frame 402 at the end of the second time period.

Figure 4C:
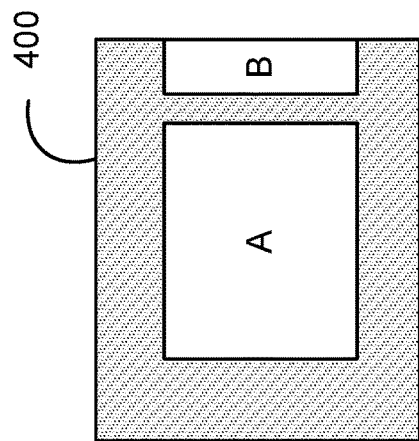
FIG. 4C is a simplified diagram of an example frame of video content, resulting from the performance of a third step in connection with the DVE.

During a next, third time period, the first DVE system 308 can perform a third step that involves "moving" from right to left, images A, B, C, and D until image C is positioned over the center region of the background image. FIG. 4C is a simplified depiction of an example frame 404 at the end of the third time period.

Figure 4D:
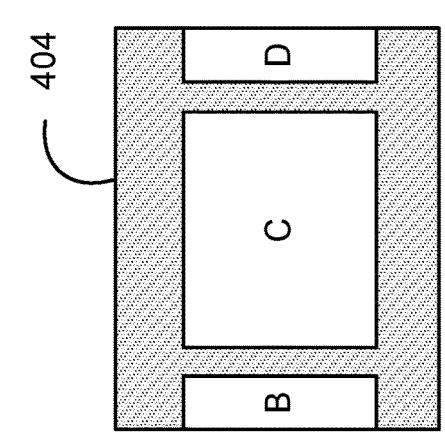
FIG. 4D is a simplified diagram of an example frame of video content, resulting from the performance of a fourth step in connection with the DVE.

During a next, fourth time period, the first DVE system 308 can perform a fourth step that involves "moving" from right to left, images B, C, and D until image D is positioned over the center region of the background image. FIG. 4D is a simplified depiction of an example frame 406 at the end of the fourth time period.

As noted above, the DVE template can specify various timing aspects, such as when each step is to start being performed and for how long each step is to be performed. As such, in one example, the DVE template can specify that each step is to be performed for two seconds. Further, the DVE template can specify that the first DVE system 308 is to start performing the first step at a particular time, and that each of steps two, three, and four are to start being performed five seconds after the performance of the previous step has concluded.

As such, at the start time, the first DVE system 308 can begin performing the first step. Two seconds later, the first DVE system 308 can conclude performing the first step (resulting in the generation of frame 400). Five seconds later, the first DVE system 308 can begin performing the second step. Two seconds later, the first DVE system 308 can conclude performing the second step (resulting in the generation of frame 402). Five seconds later, the first DVE system 308 can begin performing the third step. Two seconds later, the first DVE system 308 can conclude performing the third step (resulting in the generation of frame 404). Five seconds later, the first DVE system 308 can begin performing the fourth step. Two seconds later, the first DVE system 308 can conclude performing the fourth step (resulting in the generation of frame 406). Collectively, this results in the each of the images A, B, C, and D scrolling from left to right, but with each image "pausing" in the center region for five seconds before continuing to move left.

It should be appreciated that the first DVE system 308 can execute a wide variety of different types of DVEs, and can thus generate a wide variety of different types of video content. Among other things, a DVE can involve inserting, moving, removing, overlaying, and/or scaling various different types of content, such as text, images, and/or video content, to generate resulting video content.

As noted above, the first DVE system 308 can receive content and can execute a DVE that causes the first DVE system to generate video content that includes the received content. In another example, the first DVE system 308 can receive content and can also receive metadata of that content. The first DVE system 308 can then execute a DVE that causes the first DVE system 308 to generate video content that includes the received content and content derived from the received metadata. As such, in the example DVE discussed above in connection with FIGS. 4A-4D, such content derived from the metadata can be can overlaid on the image A as it moves from right to left, for instance.

In one example, in the case where the content is an image and the metadata represents a time at which the end-user device 304 captured the image, the first DVE system 308 can execute a DVE that causes the first DVE system 308 to generate video content that includes the image and content derived from the metadata overlaid on at least a portion of the image, or otherwise portrayed in association with the image (or video content). In some instances, other relevant content (e.g., text) can also be overlaid on a portion of the image. For example, where the metadata specifies "7:44 pm ET on Sep. 9, 2016," the generated video content can include the following text overlaid on at least a portion of the image: "Photo taken at 7:44 pm ET on Sep. 9, 2016." The first DVE system 308 can therefore include or be a character generator that generates the text (e.g., "Photo taken at 7:44 pm ET on Sep. 9, 2016.") to be overlaid on the content. In some examples, the first DVE system 308 can include a graphics rendering system that generates a graphical representation of the time-specifying metadata, such as an image of an analog clock face with hands indicating 7:44, or an image of a calendar of the month of September, with a region representing the ninth day of the month highlighted, among numerous other possibilities. Such text and/or graphics generated according to the time-specifying metadata can then be overlaid on the content itself by the first DVE system 308.

In another example, in the case where the content is an image and the metadata represents a location of the end-user device 304 proximate a time when the end-user device 304 captured at least a portion of the content, the first DVE system 308 can execute a DVE that causes the first DVE system 308 to generate video content that includes the image and content derived from the metadata overlaid on at least a portion of the image, or otherwise portrayed in association with the image (or video content). In some instances, other relevant data (e.g., text) can also be overlaid on a portion of the image. For example, where the metadata specifies latitude and longitude coordinates of "41.8° N, 87.6° W," the generated video content can include the following text overlaid on at least a portion of the image: "Photo taken from Lat/Long: 41.8° N, 87.6° W." The first DVE system 308 can therefore include a character generator that generates the text (e.g., "Photo taken from Lat/Long: 41.8° N, 87.6° W.") to be overlaid on the content. In some examples, the first DVE system 308 can include a graphics rendering system that generates a graphical representation of the location-specifying metadata, such as an image of a map with an indicator indicating the location specified by the metadata, among numerous other possibilities. Such text and/or graphics generated according to the time-specifying metadata can then be overlaid on the content itself by the first DVE system 308.

In some examples, the metadata can represent information associated with the user of the end-user device 304, such as a name, a screenname, a social media account identifier, an organization with which the user is associated, etc. In some cases, such user-associated metadata information could be used to provide attribution of the content that is provided from the end-user device 304. For instance, where metadata specifies that the content is provided by a user that is a member of a journalism club, or a school newspaper, the DVE can overlay information derived from such metadata (e.g., text or graphics), such as "Photo provided by XYZ journalism club member," among numerous other examples. The first DVE system 308 can therefore include a character generator that generates the text (e.g., "Photo provided by XYZ journalism club member") to be overlaid on the content. In some examples, the first DVE system 308 can include a graphics rendering system that generates a graphical representation of the attribution-specifying metadata, such as an image of a logo (or other identifying information) associated with the particular attribution-specifying metadata. For example, a lookup table can associate a given user (and/or user-associated information) with a particular group or association and/or its associated logo and/or graphics, and that lookup table may be stored, accessed, and/or used, by the first DVE system 308 and/or other components of the VPS 202.

In some examples, the first DVE system 308 can use the received metadata and/or predetermined (e.g., accessed by the DVE system 308) to determine other data related to the received content. Then, the first DVE system 308 can execute a DVE that causes the first DVE system 308 to generate video content that includes the received content and the determined data. As such, in the example DVE discussed above in connection with FIGS. 4A-4D, the determined data can be can overlaid on the image A as it moves from right to left, for instance.

For example, in the case where the content is an image and the metadata represents a time at which the end-user device 304 captured the image, the first DVE system 308 can use the metadata to determine a time period that has elapsed since the time at which the end-user device 304 captured the image. Then, the first DVE system 308 can execute a DVE that causes the first DVE system 308 to generate video content that includes the image and the determined data overlaid on at least a portion of the image. In some instances, other relevant content (e.g., text) can also be overlaid on a portion of the image. For example, where the metadata specifies "7:44 pm ET on Sep. 9, 2016," and the time at which the first DVE system 308 executes the corresponding DVE is "8:54 pm ET on Sep. 9, 2016," the generated video content can include the following text overlaid on at least a portion of the image: "Photo taken 1 hour and 10 minutes ago." Moreover, the DVE system 308 can additionally and/or alternatively access the scheduling system 312 and/or sequencing system 314 to determine an actual (and/or predicted) playout time of the content itself over the VBS 204, and use that time as a basis to determine the time period that will have elapsed since the time when the end-user device 304 captured the image (and/or video content), and/or the time when the VPS 202 plans to process the image (and/or video) for inclusion in the output (208) to the VBS 204. Further still, the DVE system 308 can additionally and/or alternatively access another component of the VPS 202 to determine a time since a given event has occurred, such as a newsworthy event, and use that time as a basis to determine the period that will have elapsed since the time when the end-user device 304 captured the image (and/or video).

As another example, in the case where the content is an image and the metadata represents a location at which the end-user device 304 captured the image, the first DVE system 308 can use the metadata to determine another representation of the location. In one example, the DVE system 308 can do so by using a mapping table to map one type of location representation (e.g., latitude and longitude coordinates) to another type of location representation (e.g., a city and state name). Then, the first DVE system 308 can execute a DVE that causes the first DVE system 308 to generate video content that includes the image and the determined data overlaid on at least a portion of the image. In some instances, other relevant content (e.g., text) can also be overlaid on a portion of the image. For example, where the metadata specifies the latitude and longitude coordinates of "41.8° N, 87.6° W," the generated video content can include the following text overlaid on at least a portion of the image: "Photo taken in Chicago, Ill." Further still, the generated video content can include a graphic of the state of Illinois and surrounding region with a star (or other indicator) near the city of Chicago to indicate, graphically, that the video content was based on source content obtained in the city of Chicago. Of course, such location-specific information could also be used to indicate an intersection, or street-address-specific location as well.

In some examples, the metadata can represent content associated with the user of the end-user device 304, such as a name, a screenname, a social media account identifier, an organization with which the user is associated, etc. In some cases, such user-associated metadata information can be used to provide attribution of the content that is provided from the end-user device 304. For instance, where metadata specifies that the content is provided by a user that is a member of a journalism club, or a school newspaper, the DVE can overlay content derived from such metadata (e.g., text or graphics), such as "Photo provided by XYZ journalism club member," among numerous other examples. The first DVE system 308 can therefore include a character generator that generates the text (e.g., "Photo provided by XYZ journalism club member") to be overlaid on the content. In some examples, the first DVE system 308 can include a graphics rendering system that generates a graphical representation of the attribution-specifying metadata, such as an image of a logo (or other identifying information) associated with the particular attribution-specifying metadata. For example, a lookup table may associate a given user (and/or user-associated information) with a particular group or association and/or its associated logo and/or graphics, and that lookup table may be stored, accessed, and/or used, by the first DVE system 308 and/or other components of the VPS 202.

Although examples have been provided above in connection with image content, the examples can be varied as appropriate to apply to other types of content. For instance, in some examples, the first DVE system 308 can receive video content and metadata, and can generate a DVE that causes the first DVE system 308 to generate video content that includes the received video content and the metadata (e.g., with the metadata being overlaid on a portion of the received video content).

Alternatively, the first DVE system 308 can use the received metadata to determine data related to the received video content, and can generate a DVE that causes the first DVE system 308 to generate video content that includes the received video content and the determined data (e.g., with the determined data being overlaid on a portion of the received video content). In this case, given the nature of video content, the generated video content can include related data that gets modified as the video content advances or "plays out." For instance, the generated video content can show a time period that has elapsed since the time at which the end-user device 304 captured the video content, where that time period is modified as appropriate as the video content advances or "plays out." In some instances, the determined data can be based on both the received metadata and other data accessed by the DVE system 308, such as a current clock time, a scheduled time for a given event to occur (e.g., accessed from the scheduling system 312), a location associated with the VPS 202, etc.

Accordingly, the first DVE system 308 can receive content and metadata, can use the content and the metadata to generate and/or output video content that includes the content and the metadata, and can transmit the video content to the second DVE system 310. Further, the first DVE system 308 can receive content and metadata, can use the metadata to determine other data related to the content, can use the content and the determined metadata to generate and/or output video content that includes the content and the determined metadata, and can transmit the video content to the second DVE system 310.

Like the first DVE system 308, the second DVE system 310 can perform various acts and/or functions related to a DVE, perhaps based on input received from a user (e.g., a producer or technical director) via a user interface. For example, the second DVE system 310 can perform the acts and/or functions described above in connection with the first DVE system 308, but varied as appropriate for use with the second DVE system 310 instead of the first DVE system 308.

Generally, the first DVE system 308 executes certain types of DVEs, and the second DVE system 310 executes other types of DVEs, namely those that are more suited to be executed further downstream in the video production process. However, various DVE-related configurations are possible. For example, either the first DVE system 308 or the second DVE system 310 can perform the acts and/or functions described herein as being performed by the other of the two systems. In another example, the VPS 202 can instead include a single DVE system that provides the functionality of both the first DVE system 308 and the second DVE system 310.

The second DVE system 310 can receive content in various ways. For example, the second DVE system 310 can receive content from another entity, such as the video source 302 and/or the first DVE system 308. In another example, the second DVE system 310 can receive content by selecting and retrieving it from a data storage unit (e.g., a data storage unit of the second DVE system 310).

The second DVE system 310 can execute a DVE based on a DVE template. The DVE template can specify how the second DVE system 310 is to receive content. In one example, the DVE template can do so by specifying that the second DVE system 310 is to receive content on a particular input of the second DVE system 310 (e.g., an input that maps to a particular entity, such as the video source 302 or the first DVE system 308). In another example, the DVE template can do so by specifying that the second DVE system 310 is to receive content by retrieving it from a particular location of a particular data storage unit (e.g., a data storage unit of the second DVE system 310).

As noted above, a DVE template can be configured in various ways. As such, the second DVE system 310 can execute various types of DVEs. In one example, a DVE template can specify that the second DVE system 310 is to receive first video content from the video source 302 and second video content from the first DVE system 308, and is to overlay the received second video content on a portion of the received first video content, thereby generating third video content.

Figure 5A:
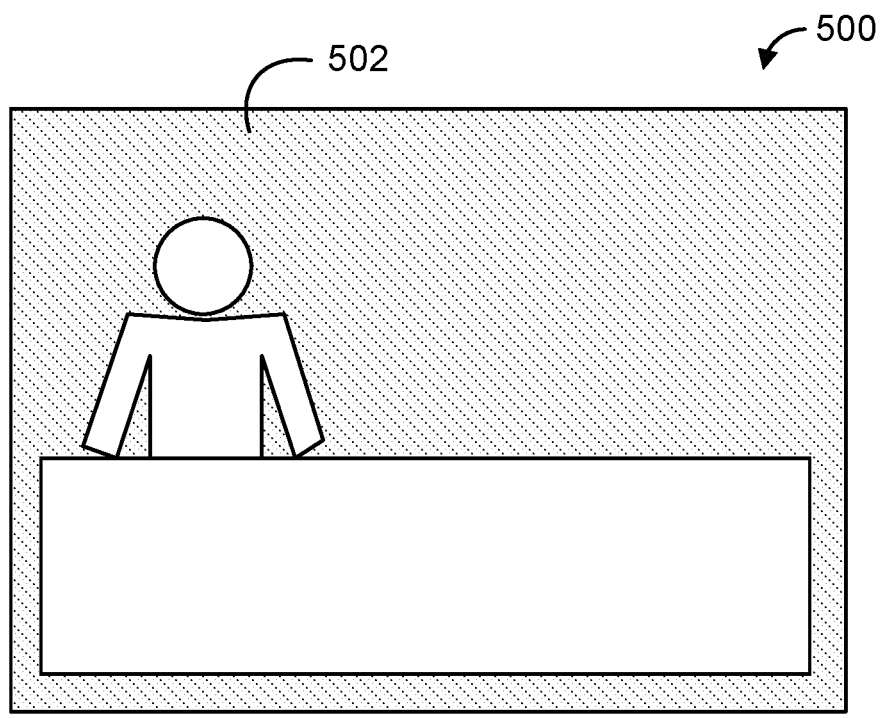
FIG. 5A is a simplified diagram of an example frame of video content, without content overlaid thereon.
Figure 5B:
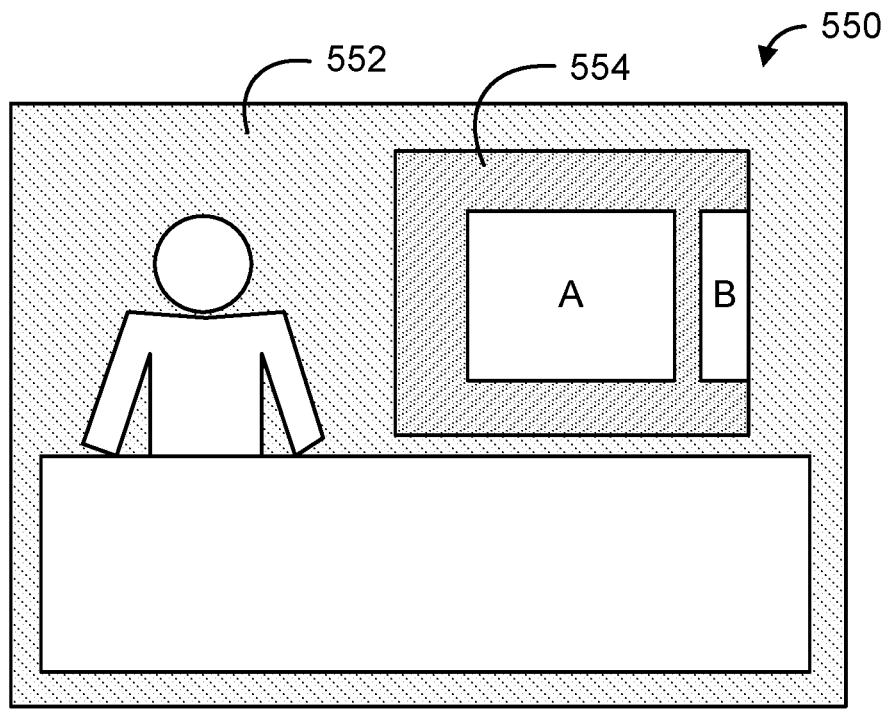
FIG. 5B is a simplified diagram of another example frame of video content, with content overlaid thereon.

FIGS. 5A and 5B help illustrate the concept of overlaying video content on other video content. FIG. 5A is a simplified depiction of an example frame 500 of video content. Frame 500 shows content 502, which is a scene where a news anchor is discussing a news story, but does not include other content overlaid on content 502. For comparison, FIG. 5B is a simplified depiction of another example frame 550 of video content. Frame 550 includes content 552, which is also a scene where a news anchor is discussing a news story, but further includes other content 554 overlaid on a portion of the content 552. In this example, the content 554 shows scrolling images related to the news story, and is overlaid on a portion of the scene where the news anchor is discussing the news story.

After the second DVE system 310 generates and/or outputs the video content, the second DVE system 310 can transmit the video content to another entity, such as the VBS 204, and/or can store the video content in a data storage unit (e.g., a data storage unit of the second DVE system 310).

As discussed above, in one example, the second DVE system 310 can receive first video content that includes content, and can use the first video content to generate and/or output second video content that also includes the content. The second video content can then serve as or be part of a video program. As such, this is an example way in which the VPS 202 can integrate content into a video program.

However, the VPS 202 can also integrate content into a video program in other ways. For example, in the case where the video source 302 is a video camera, the first DVE system 308 can generate video content and can transmit the generated video content to a display device located within a field of the view of the video camera. This can allow the video camera to capture video content that includes the generated video content as it is displayed on the display device. Then, by integrating the captured video content into a video program, the VPS 202 can therefore also integrate the generated video content displayed on the display device, into the video program.

In one example, the display device can be integrated with a touch-sensitive panel, which can allow a user (e.g., a news anchor) to interact with the content. To facilitate the user's interaction with the content, the display device and/or related components can perform particular acts and/or functions in response to a user providing certain touch commands.

In one example, the display device can initially display multiple small tiles, each representing a different content item. The position and ordering of the small tiles can be determined by a DVE template, which can specify that certain touch commands cause the display device to perform certain acts and/or functions in connection with the displayed content items. For example, if a user taps on one of the small items a first time, the display device can show the content item in an enlarged view and perhaps show additional elements of, or information associated with, the content item. As the user interacts with the content items displayed on the display device, the video camera can generate video content including these interactions and thereby integrate the content items into the video program.

The scheduling system 312 can perform various acts and/or functions related to the scheduling of video content production, perhaps based on input received from a user (e.g., a producer or technical director) via a user interface. For example, the scheduling system 312 can create and/or modify a program schedule. Further, the scheduling system 312 can store and/or retrieve a program schedule. As such, the scheduling system 312 can store a program schedule in a data storage unit (e.g., a data storage unit of the scheduling system 312), and can then receive the program schedule by selecting and retrieving it from the data storage unit. The scheduling system 312 can also transmit a program schedule to another entity, such as the sequencing system 314.

The sequencing system 314 can process records in the program schedule perhaps based on input received from a user (e.g., a producer or technical director) via a user interface. This can cause the sequencing system 314 to control one or more other components of the VPS 202 to facilitate the VPS 202 generating and/or outputting video content, which can serve as or be part of a video program. For example, the sequencing system 314 can control the video source 302, the content system 306, the first DVE system 308, and/or the second DVE system 310 to perform various acts and/or functions, such as those described in this disclosure.

The sequencing system 314 can receive a program schedule in various ways. For example, the sequencing system 314 can do so by receiving it from another entity, such as the scheduling system 312. In another example, the sequencing system 314 can do so by selecting and retrieving it from a data storage unit (e.g., a data storage unit of the scheduling system 312).

A program schedule (sometimes referred to in the industry as a "rundown") serves as a schedule or outline of a video program and can include multiple records. A video program can be conceptually divided into multiple logically-separated portions, sometimes referred to in the industry as "stories." As such, each portion of the video program can be represented by a separate record of the program schedule. In some cases, each record can also include one or more sub-records. Each record (including a sub-record) can include various types of data.

In some instances, the sequencing system 314 can process a next record in the program schedule based on a trigger event. In one example, the trigger event can be the sequencing system 314 completing one or more actions related to a current record in the program schedule. In another example, the trigger event can be the sequencing system 314 receiving input from a user via a user interface.

Referring back to FIG. 2, the VBS 204 can receive video content from the VPS 202, which in turn can transmit the video content to the end-user device 206 for presentation of the video content to an end user. In practice, the video system 200 is likely to include a large number of these end-user devices 206 and corresponding connection mechanisms, each connecting the VBS 204 with a respective one of the end-user devices 206. Thus, in practice, the VBS 204 can transmit video content to a large number of end-user devices 206 for presentation of the video content to a large number of end users.

The VBS 204 can transmit video content to the end-user device 206 in various ways. For example, VBS 204 can transmit video content to the end-user device 206 over-the-air or via a packet-based network such as the Internet. The end-user device 206 can receive video content from the VBS 204, and can present the video content to an end user via a user interface.

Figure 6:
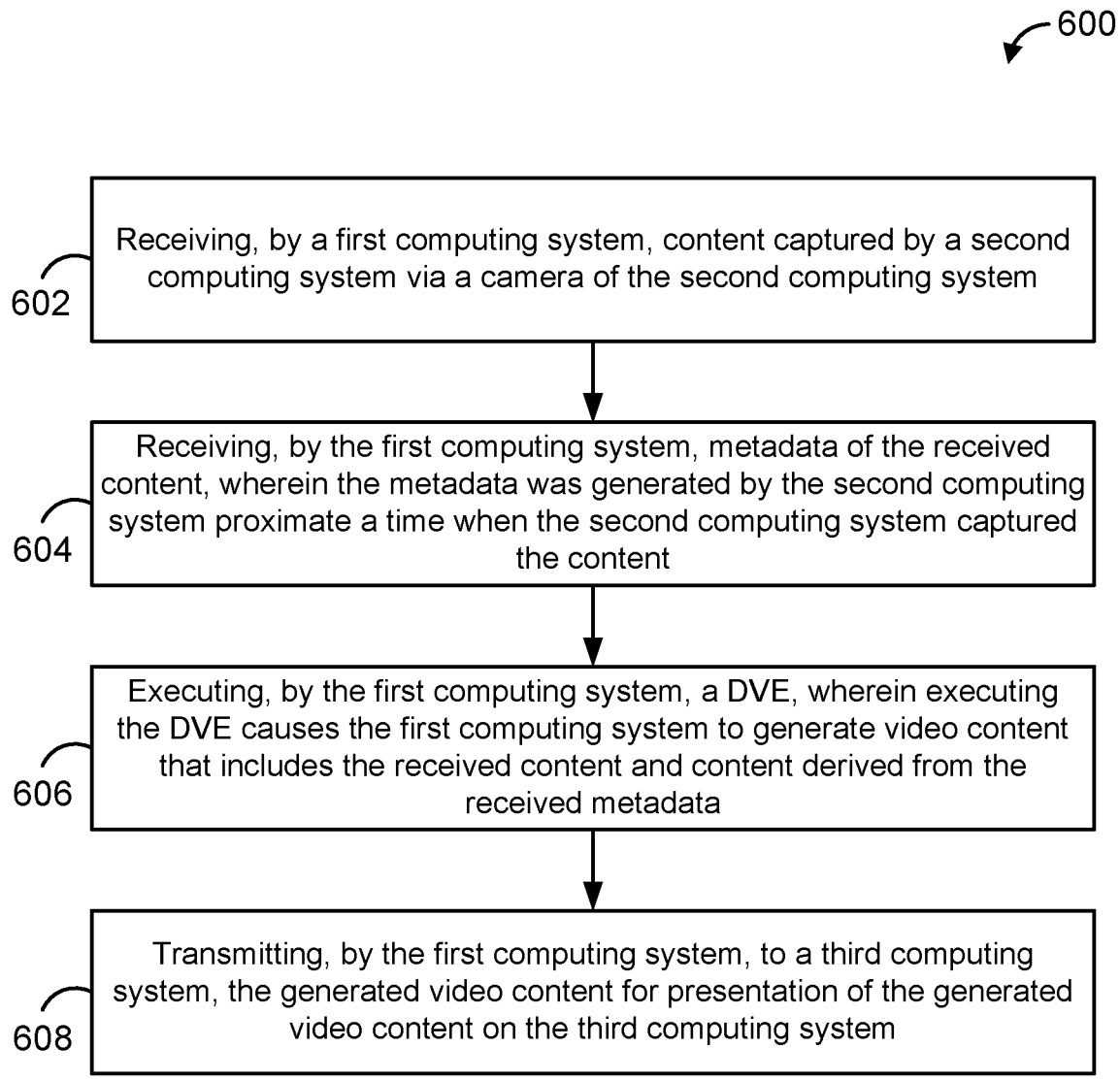
FIG. 6 is a flow chart of an example method.

FIG. 6 is a flow chart illustrating an example method 600.

At block 602, the method 600 can include receiving, by a first computing system, content captured by a second computing system via a camera of the second computing system.

At block 604, the method 600 can include receiving, by the first computing system, metadata of the received content, wherein the metadata was generated by the second computing system proximate a time when the second computing system captured the content.

At block 606, the method 600 can include executing, by the first computing system, a DVE, wherein executing the DVE causes the first computing system to generate video content that includes the received content and content derived from the received metadata.

At block 608, the method 600 can include transmitting, by the first computing system, to a third computing system, the generated video content for presentation of the generated video content on the third computing system.

Figure 7:
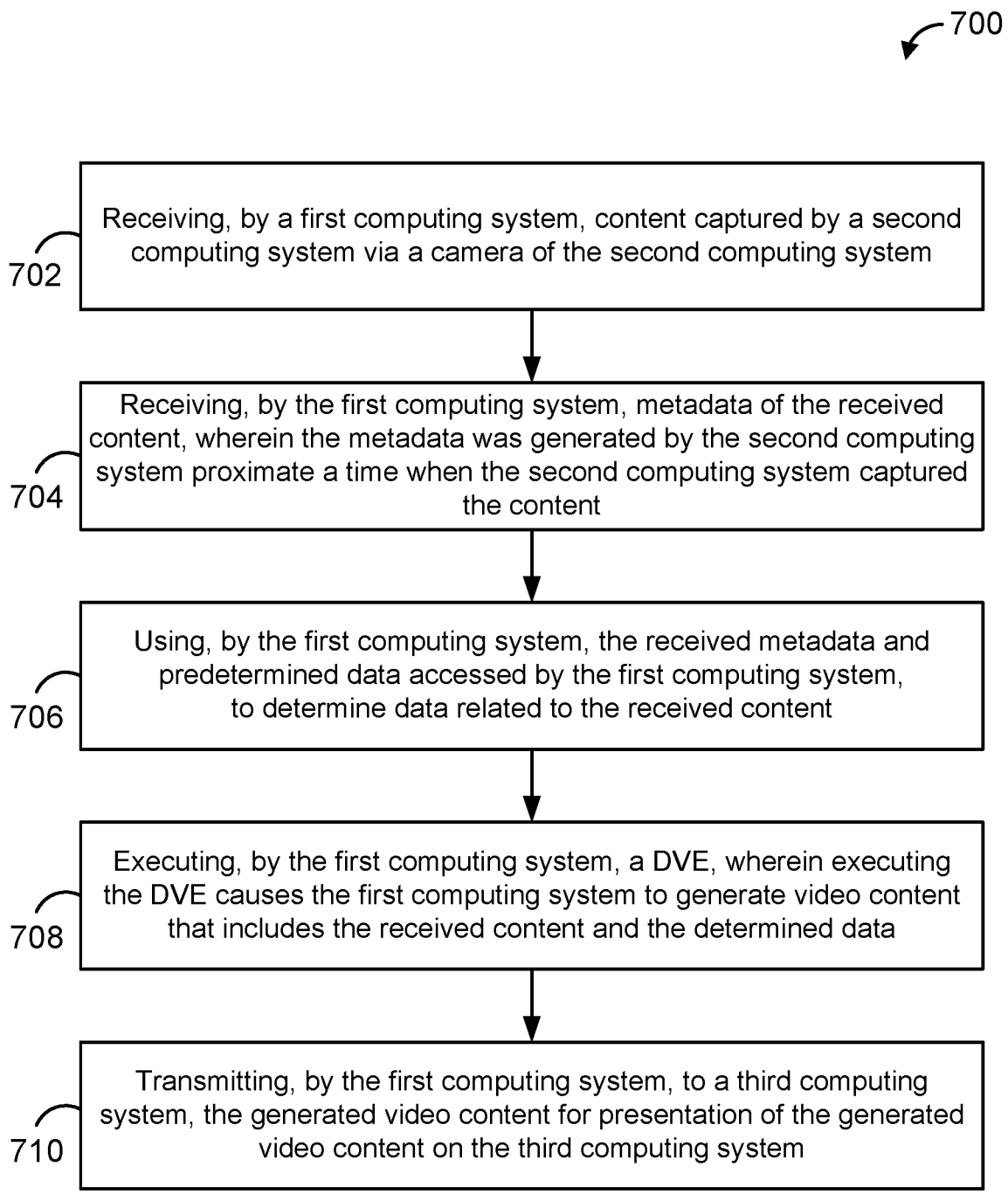
FIG. 7 is a flow chart of another example method.

FIG. 7 is a flow chart illustrating an example method 700.

At block 702, the method 700 can include receiving, by a first computing system, content captured by a second computing system via a camera of the second computing system.

At block 704, the method 700 can include receiving, by the first computing system, metadata of the received content, wherein the metadata was generated by the second computing system proximate a time when the second computing system captured the content.

At block 706, the method 700 can include using, by the first computing system, the received metadata and predetermined data accessed by the first computing system, to determine data related to the received content.

At block 708, the method 700 can include executing, by the first computing system, a DVE, wherein executing the DVE causes the first computing system to generate video content that includes the received content and the determined data.

At block 710, the method 700 can include transmitting, by the first computing system, to a third computing system, the generated video content for presentation of the generated video content on the third computing system.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method performed by one or more processors of a first computing system, the method comprising:

receiving content captured by a second computing system via a camera of the second computing system;

receiving metadata of the received content, wherein the
metadata was generated by the second computing system proximate a time when the second computing system captured the content;
deriving content from the received metadata, wherein the content derived from the received metadata is related to the received content;
executing a first digital-video effect (DVE), wherein executing the first DVE causes the generation of first video content that includes the received content and a graphical representation of the content derived from the received metadata, wherein the graphical representation comprises a combination of the content derived from the received metadata and added text or graphics;
receiving second video content;
executing a second DVE, wherein executing the second DVE causes the generation of third video content that includes both the first video content and the second video content; and
transmitting to a third computing system, the generated third video content for presentation of the generated third video content on the third computing system.

2. The method of claim 1, wherein the first computing system is a video system comprising (i) a video-production system (VPS) and (ii) a video-broadcast system (VBS), wherein the second computing system is an end-user device, and wherein the third computing system is another end-user device.

3. The method of claim 1, wherein the metadata represents a time at which the second computing system captured at least a portion of the content.

4. The method of claim 1, wherein the metadata represents a location of the second computing system proximate the time when the second computing system captured at least a portion of the content.

5. The method of claim 1, wherein executing the first DVE causes the generation of the first video content by overlaying the graphical representation of the content derived from the received metadata on the received content.

6. A method performed by one or more processors of a first computing system, the method comprising:
receiving content captured by a second computing system via a camera of the second computing system;
receiving metadata of the received content, wherein the metadata was generated by the second computing system proximate a time when the second computing system captured the content;
using the received metadata and predetermined data to determine data related to the received content;
executing a first digital-video effect (DVE), wherein executing the first DVE causes the generation of first video content that includes the received content and a graphical representation of the determined data, wherein the graphical representation comprises a combination of the determined data and added text or graphics;
receiving second video content;
executing a second DVE, wherein executing the second DVE causes the generation of third video content that includes both the first video content and the second video content; and
transmitting to a third computing system, the generated third video content for presentation of the generated video content on the third computing system.

7. The method of claim 6, wherein the first computing system is a video system comprising (i) a video-production system (VPS) and (ii) a video-broadcast system (VBS),
wherein the second computing system is an end-user device, and wherein the third computing system is another end-user device.

8. The method of claim 6, wherein the metadata represents a time at which the second computing system captured at least a portion of the content, and wherein the determined data represents a time period that has elapsed since the time at which the second computing system captured at least the portion of the content.

9. The method of claim 6, wherein the metadata comprises data that represents a location of the second computing system proximate the time when the second computing system captured the content, and wherein the determined data is another representation of the location.

10. The method of claim 6, wherein executing the first DVE causes the generation of the first video content by overlaying the graphical representation of the determined data on the received content.

11. A non-transitory computer-readable medium having stored thereon program instructions that, upon execution by one or more processors of a first computing system, cause the first computing system to perform of a set of acts comprising:
receiving content captured by a second computing system via a camera of the second computing system;
receiving metadata of the received content, wherein the metadata was generated by the second computing system proximate a time when the second computing system captured the content;
deriving content from the received metadata, wherein the content derived from the received metadata is related to the received content;
executing a first digital-video effect (DVE), wherein executing the first DVE causes the generation of first video content that includes the received content and a graphical representation of content derived from the received metadata, wherein the graphical representation comprises a combination of the content derived from the received metadata and added text or graphics;
receiving second video content;
executing a second DVE, wherein executing the second DVE causes the generation of third video content that includes both the first video content and the second video content; and
transmitting to a third computing system, the generated third video content for presentation of the generated video content on the third computing system.

12. The non-transitory computer-readable medium of claim 11, wherein the first computing system is a video system comprising (i) a video-production system (VPS) and (ii) a video-broadcast system (VBS), wherein the second computing system is an end-user device, and wherein the third computing system is another end-user device.

13. The non-transitory computer-readable medium of claim 11, wherein the metadata represents a time at which the second computing system captured at least a portion of the content.

14. The non-transitory computer-readable medium of claim 11, wherein the metadata represents a location of the second computing system proximate the time when the second computing system captured at least a portion of the content.

15. The non-transitory computer-readable medium of claim 11, wherein executing the first DVE causes the generation of the first video content by overlaying the graphical representation of the content derived from the received metadata on the received content.

16. A non-transitory computer-readable medium having stored thereon program instructions that, upon execution by one or more processors of a first computing system, cause the first computing system to perform of a set of acts comprising:
- receiving content captured by a second computing system via a camera of the second computing system;
- receiving metadata of the received content, wherein the metadata was generated by the second computing system proximate a time when the second computing system captured the content;
- using the received metadata and predetermined data to determine data related to the received content;
- executing a first digital-video effect (DVE), wherein executing the first DVE causes the generation of first video content that includes the received content and a graphical representation of the determined data, wherein the graphical representation comprises a combination of the determined data and added text or graphics;
- receiving second video content;
- executing a second DVE, wherein executing the second DVE causes the generation of third video content that includes both the first video content and the second video content; and
- transmitting to a third computing system, the generated third video content for presentation of the generated video content on the third computing system.

17. The non-transitory computer-readable medium of claim 16, wherein the first computing system is a video system comprising (i) a video-production system (VPS) and (ii) a video-broadcast system (VBS), wherein the second computing system is an end-user device, and wherein the third computing system is another end-user device.

18. The non-transitory computer-readable medium of claim 16, wherein the metadata represents a time at which the second computing system captured at least a portion of the content, and wherein the determined data represents a time period that has elapsed since the time at which the second computing system captured at least the portion of the content.

19. The non-transitory computer-readable medium of claim 16, wherein the metadata comprises data that represents a location of the second computing system proximate the time when the second computing system captured the content, and wherein the determined data is another representation of the location.

20. The non-transitory computer-readable medium of claim 16, wherein executing the first DVE causes the generation of the first video content by overlaying the graphical representation of the determined data on the received content.

* * * * *